United States Patent
Kaiser

(10) Patent No.: US 10,089,602 B2
(45) Date of Patent: Oct. 2, 2018

(54) FAST BRANCH-BASED HYBRID BOM SYSTEM AND METHOD

(71) Applicant: SIEMENS PRODUCT LIFECYCLE MANAGEMENT SOFTWARE INC., Plano, TX (US)

(72) Inventor: Reiner K. Kaiser, Redondo Beach, CA (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 484 days.

(21) Appl. No.: 14/795,270

(22) Filed: Jul. 9, 2015

(65) Prior Publication Data
US 2017/0011341 A1    Jan. 12, 2017

(51) Int. Cl.
*G06Q 10/08*    (2012.01)
(52) U.S. Cl.
CPC ............................ *G06Q 10/0875* (2013.01)
(58) Field of Classification Search
None
See application file for complete search history.

(56) References Cited

U.S. PATENT DOCUMENTS

| | | | |
|---|---|---|---|
| 7,970,667 B2* | 6/2011 | Fitt | G06F 17/50 700/105 |
| 9,483,587 B2* | 11/2016 | Tiwari | G06Q 10/0875 |
| 2007/0162171 A1* | 7/2007 | McDonald | G06Q 10/0875 700/106 |
| 2013/0246451 A1 | 9/2013 | Kaiser | |

FOREIGN PATENT DOCUMENTS

WO   2010025312 A2   3/2010
WO   2015083294 A1   6/2015

* cited by examiner

*Primary Examiner* — Florian M Zeender
*Assistant Examiner* — Denisse Y Ortiz Roman

(57) ABSTRACT

A fast branch-based hybrid Bill of Materials (BOM) system and method is provided that generates a BOM having a plurality of BOM lines that specify component revisions of components stored in a data store that are usable to build a structure. The BOM lines may be configured via at least one baseline branch and at least one live branch that instantiate component revisions for the structure. The system retrieves at high speed BOM lines for the BOM for components having revisions that are not associated with the at least one live branch from at least one index (i.e., cache) of BOM lines generated based on the baseline branch. The system also configures BOM lines for the BOM for components having revisions associated with the at least one live branch via at least one configuration rule. The system also causes a display device to output a list of component revisions based at least in part on the generated BOM.

20 Claims, 8 Drawing Sheets

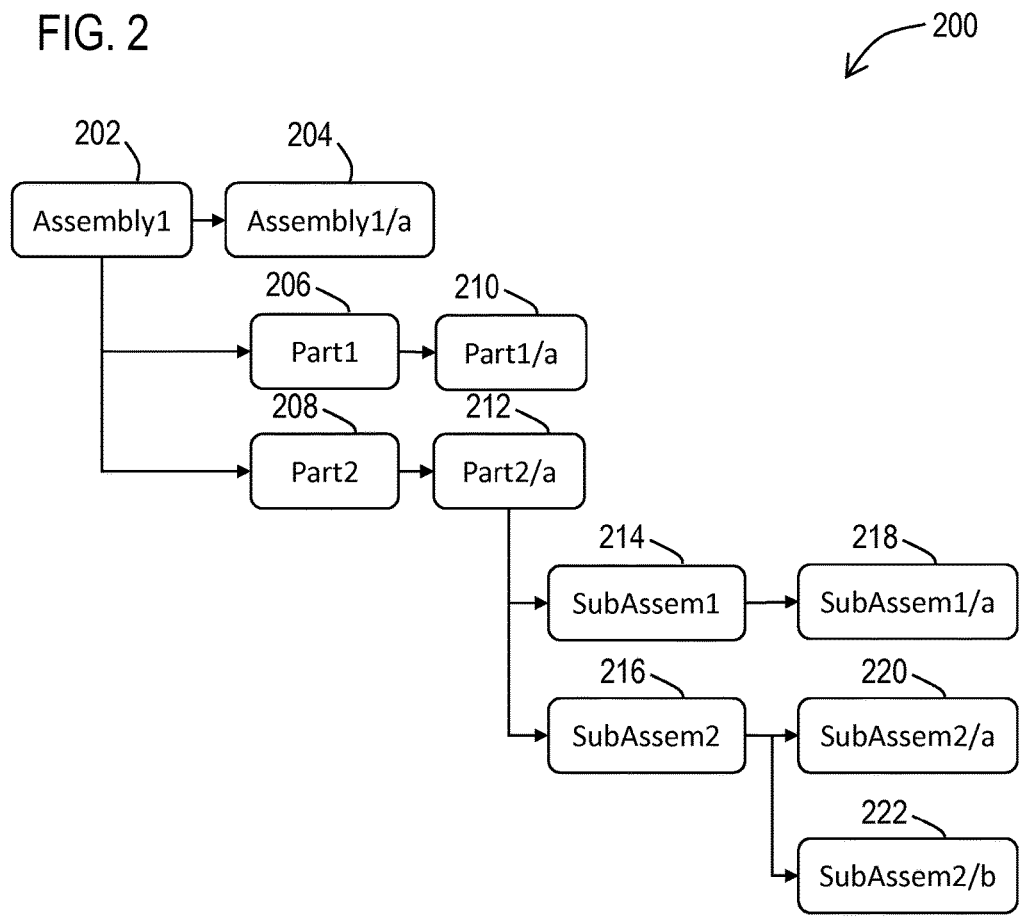

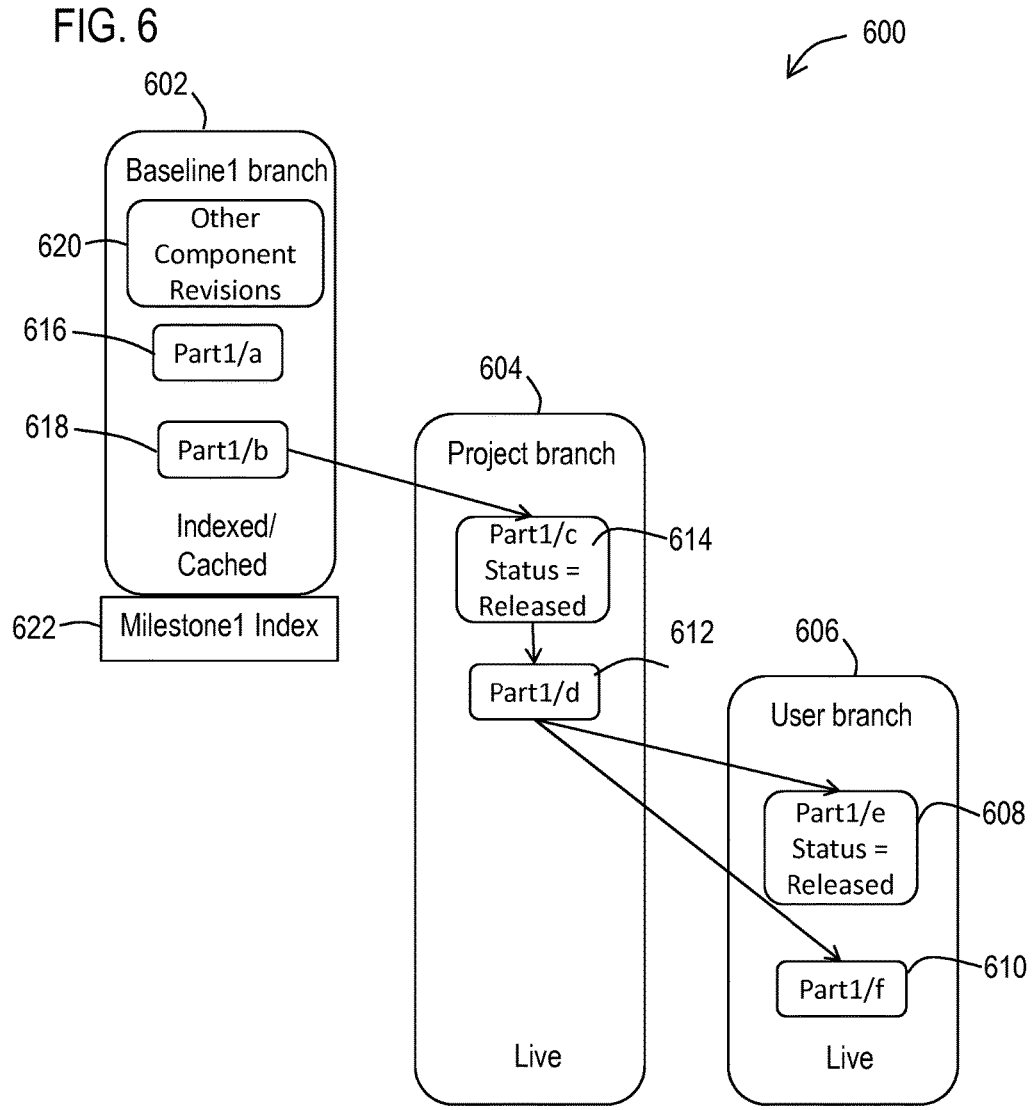

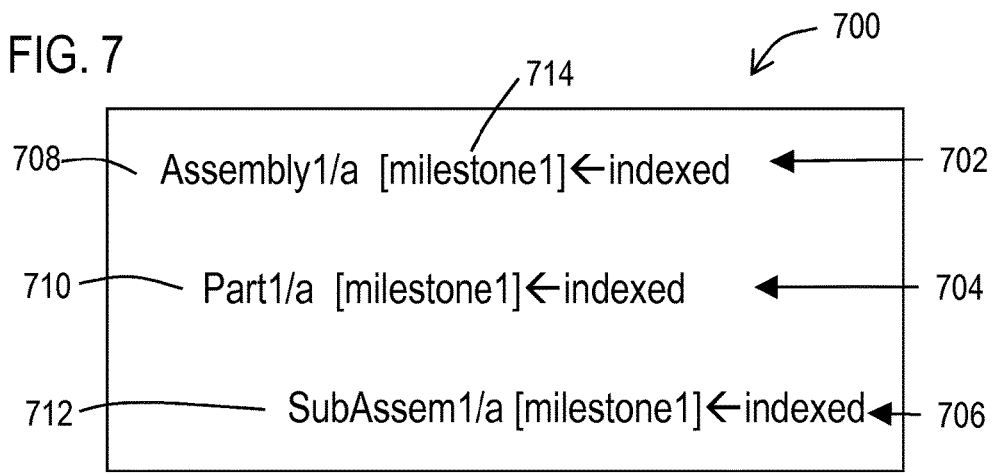
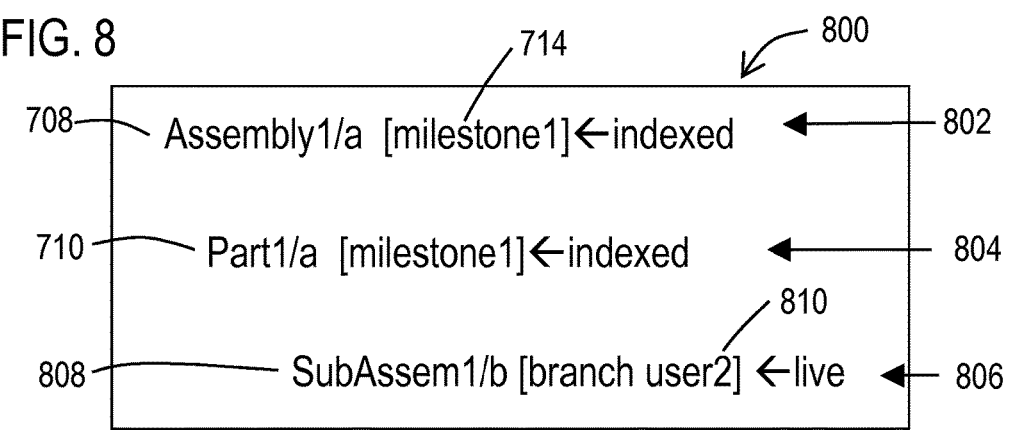
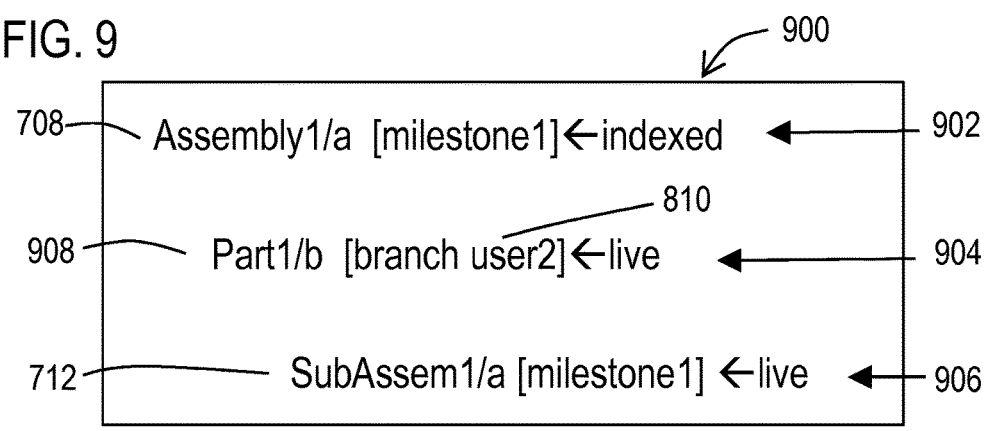

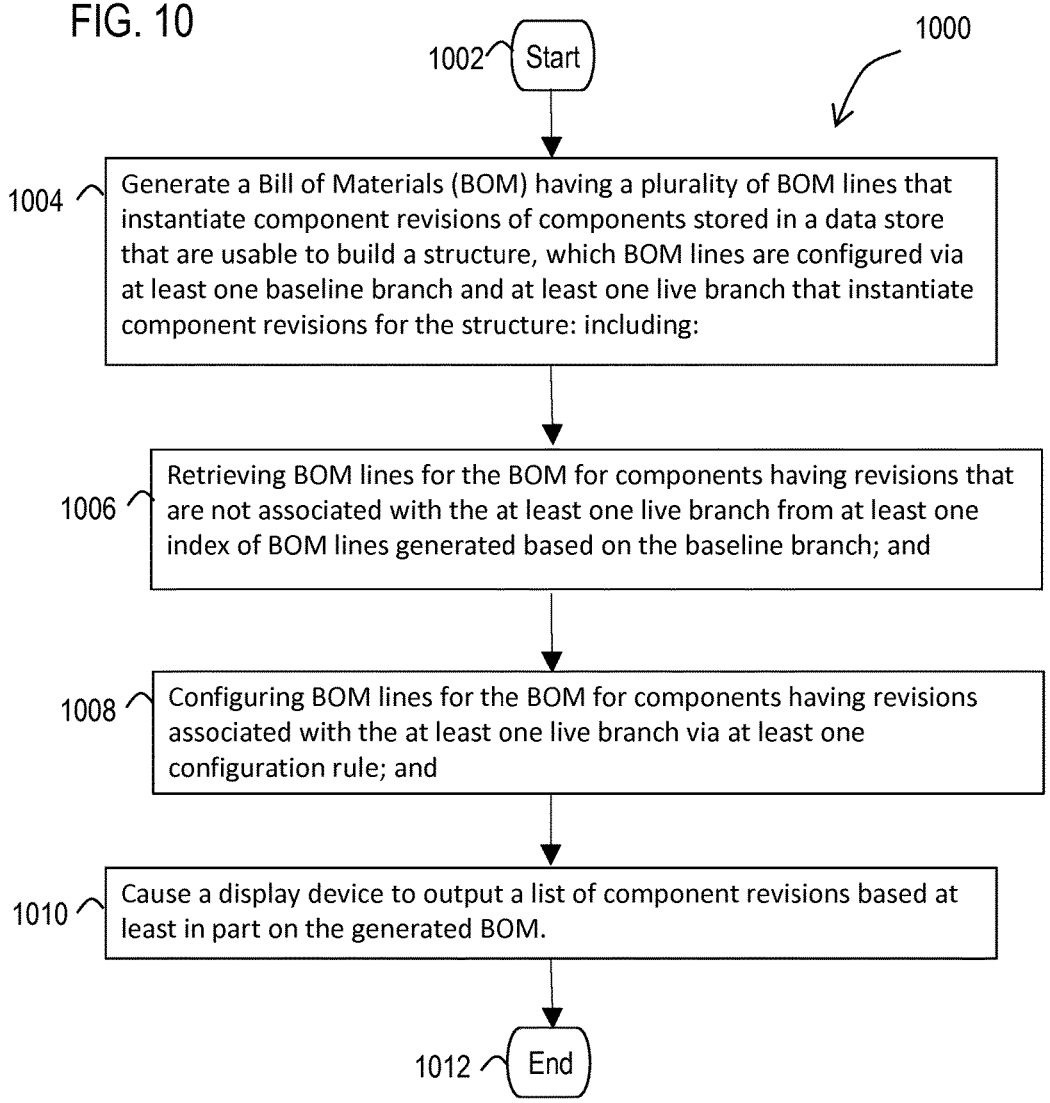

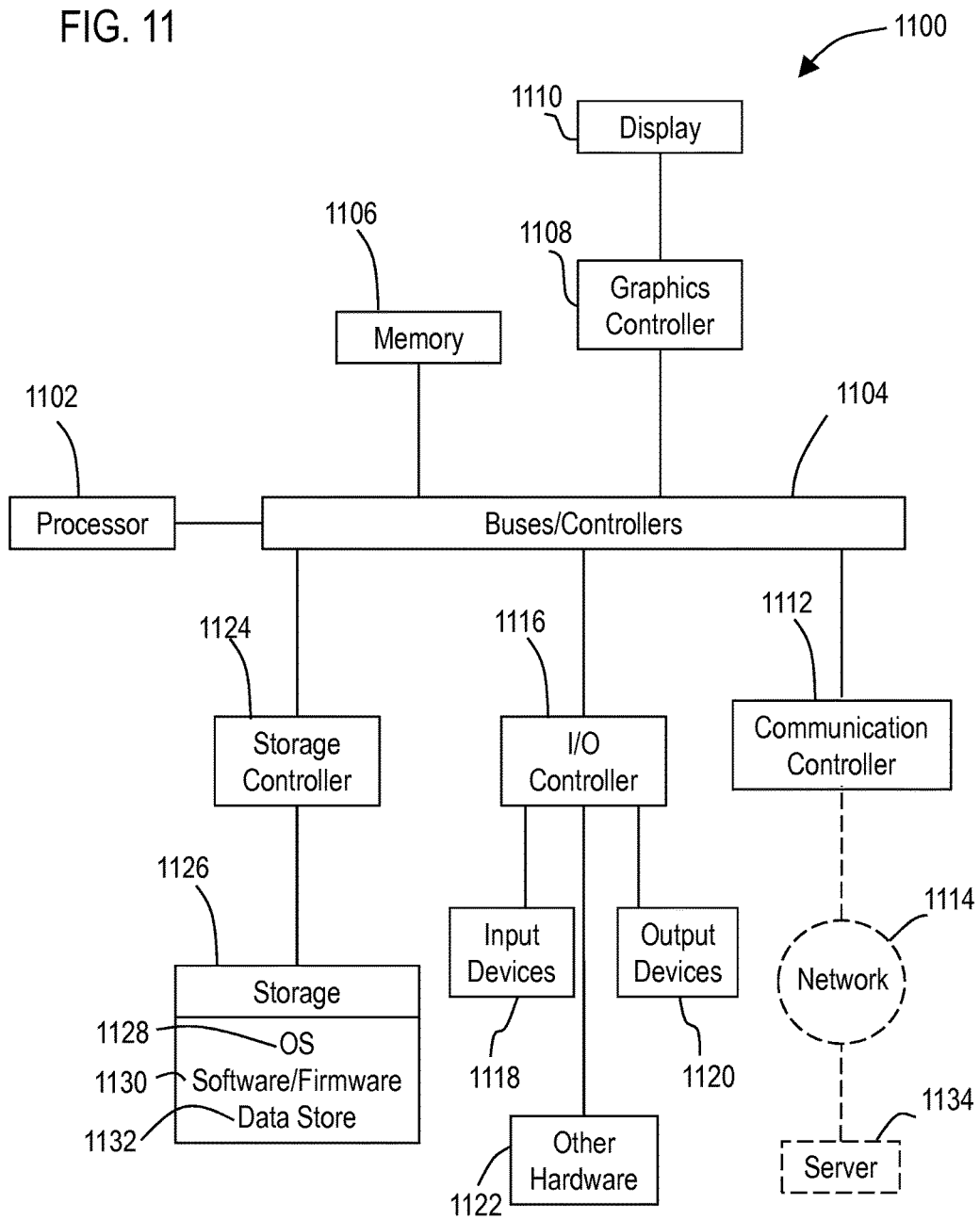

FAST BRANCH-BASED HYBRID BOM SYSTEM AND METHOD

TECHNICAL FIELD

The present disclosure is directed, in general, to computer-aided design, visualization, and manufacturing systems, product data management (PDM) systems, product lifecycle management (PLM) systems, and similar systems, that are used to create and manage data for products and other items (collectively referred to herein as product systems).

BACKGROUND

Product systems such as PDM and PLM systems may be used to manage large databases of product data. Product systems may benefit from improvements.

SUMMARY

Variously disclosed embodiments include systems and methods that may be used to generate bill of materials (BOMs) for systems comprised of a large numbers of different components and sub components, each having one or more revisions. In one example, a system may comprise at least one processor that is configured to generate a Bill of Materials (BOM) having a plurality of BOM lines that instantiate component revisions of components stored in a data store that are usable to build a structure, which BOM lines are configured via at least one baseline branch and at least one live branch that instantiate component revisions for the structure. The at least one processor may be configured to retrieve BOM lines for the BOM for components having revisions that are not associated with the at least one live branch from at least one index of BOM lines generated based on the baseline branch. In addition, the at least one processor may be configured to configure BOM lines for the BOM for components having revisions associated with the at least one live branch via at least one configuration rule. Further, the at least one processor may be configured to cause a display device to output a list of component revisions based at least in part on the generated BOM.

In another example, a method may include various acts carried out through operation of at least one processor. Such a method may include through operation of at least one processor, generating a Bill of Materials (BOM) having a plurality of BOM lines that instantiate component revisions of components stored in a data store that are usable to build a structure, which BOM lines are configured via at least one baseline branch and at least one live branch that instantiate component revisions of components for the structure. The method may also include: retrieving BOM lines for the BOM for components having revisions that are not associated with the at least one live branch from at least one index (e.g., a cache) of BOM lines generated based on the baseline branch; and configuring BOM lines for the BOM for components having revisions associated with the at least one live branch via at least one configuration rule. Also the method may include causing a display device to output a list of component revisions based at least in part on the generated BOM.

A further example may include non-transitory computer readable medium encoded with executable instructions (such as a software component on a storage device) that when executed, causes at least one processor to carry out this describe method.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the Detailed Description below, it may be advantageous to set forth definitions of certain words or phrases that may be used throughout this patent document. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to describe various elements, functions, or acts, these elements, functions, or acts should not be limited by these terms. Rather these numeral adjectives are used to distinguish different elements, functions or acts from each other. For example, a first element, function, or act could be termed a second element, function, or act, and, similarly, a second element, function, or act could be termed a first element, function, or act, without departing from the scope of the present disclosure.

In addition, phrases such as "processor is configured to" carry out one or more functions or processes, may mean the processor is operatively configured to or operably configured to carry out the functions or processes via software, firmware, and/or wired circuits. For example, a processor that is configured to carry out a function/process may correspond to a processor that is actively executing the software/firmware which is programmed to cause the processor to carry out the function/process and/or may correspond to a processor that has the software/firmware in a memory or storage device that is available to be executed by the processor to carry out the function/process. It should also be noted that a processor that is "configured to" carry out one or more functions or processes, may correspond to a processor circuit particularly fabricated or "wired" to carry out the functions or processes (e.g., an ASIC or FPGA design). Further the phrase "at least one" before an element (e.g., a processor) that is configured to carry out more than one function may correspond to one or more elements (e.g., processors) that each carry out the functions and may also correspond to two or more of the elements (e.g., processors) that respectively carry out different ones of the one or more different functions.

The term "adjacent to" may mean: that an element is relatively near to but not in contact with a further element; or that the element is in contact with the further portion, unless the context clearly indicates otherwise.

Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

FIG. 2 illustrates an example of a simplified product structure for an assembly having two levels of sub-components for which a BOM may be generated.

FIG. 3 illustrates an example of a simplified BOM that may be generated from the example product structure.

FIG. 6 illustrates an example of revisions assigned to branches configured live.

FIGS. 7-9 illustrate example BOM lines configured live and via indexes.

FIG. 10 illustrates a flow diagram of an example methodology that facilitates generating a BOM.

FIG. 11 illustrates a block diagram of a data processing system in which an embodiment can be implemented.

DETAILED DESCRIPTION

Figure 1:
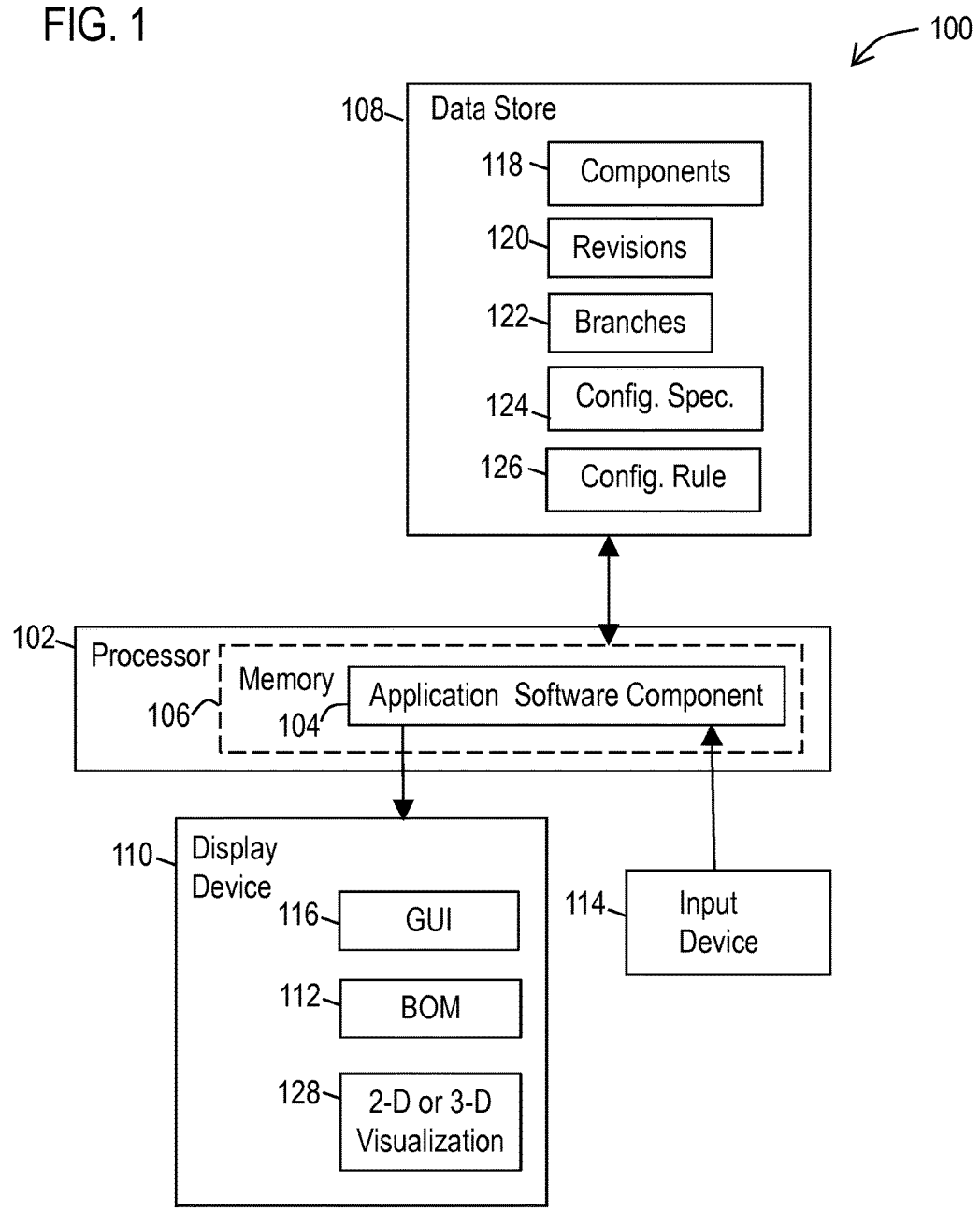
FIG. 1 illustrates a functional block diagram of an example system that facilitates generating a BOM.

Various technologies that pertain to product systems will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system components may be performed by multiple components. Similarly, for instance, a component may be configured to perform functionality that is described as being carried out by multiple components. The numerous innovative teachings of the present application will be described with reference to exemplary non-limiting embodiments.

With reference to FIG. 1, an example system 100 that facilitates fast branch-based hybrid Bill of Material (BOM) generation is illustrated. The system 100 may include at least one processor 102 (referred to herein as "the processor 102" in this example) that is configured to execute one or more application software components 104 from a memory 106 in order to carry out the various features described herein. The application software component 104, for example, may correspond to one or more components of PLM software application that is configured to generate a BOM from data stored in a data store 108 such as a database. Examples of databases that may be used as one or more data stores described herein include database server applications such as Oracle, Microsoft SQL Server, or any other type of data store that is operative to store data records. Also, example processes of using traversal rules (such as closure rules) with respect to runtime objects (such as BOM lines) is described in U.S. Publication No. 2013/0246451 A1 published Sep. 19, 2013, which is hereby incorporated herein by reference in its entirety.

In an example embodiment, the described application software component may be used to generate a BOM in a PLM system such as Teamcenter produced by Siemens Product Lifecycle Management Software Inc., of Plano Tex. However, it should be appreciated that the systems and methods described herein may be used in other product systems (e.g., PLM, PDM systems) and/or any other type of system that generates a BOM from stored product data in a database.

The described system may include at least one display device 110 (such as a display screen) or any other device that is operative to display a BOM 112 (and/or a 2-D or 3-D visualization 128 of a product structure based on a BOM). Also the described system may include at least one input device 114 (e.g., mouse, touch screen, touchpad) or any other input device via which the application software component may be configured and controlled.

Further it should be noted that the processor described herein may be located in a server that is remote from the display and input devices described herein. In such an alternative example, the described display device and input device may be included in a client device that communicates with the server (and/or a virtual machine executing on the server) through a wired or wireless network (which may include the Internet). In some embodiments, such a client device, for example, may execute a remote desktop application or may correspond to a portal device that carries out a remote desktop protocol with the server in order to send inputs from an input device to the server and receive visual information from the server to display a graphical user interface through the display device. Examples of such remote desktop protocols include Teradici's PCoIP, Microsoft's RDP, and the RFB protocol. In such examples, the processor described herein may correspond to a virtual processor of a virtual machine executing in a processor of the server. The described application software component that generates a BOM may execute in such a virtual machine on the server in this alternative example, while a user interacts with a user interface of the application software component via the display screen and input devices associated with the client device.

In addition, it should be appreciated that the described application software component 104 may be capable of producing through the display device 110, an interactive graphical user interface (GUI) 116. The GUI may be used by a user to generate and display a BOM based on a structure and component revisions stored in the data store 108. The described application software component 104 may also include a computer aided design (CAD) software component and/or may be capable of integrating the work product from CAD software for use with storing data representative of components 118 of structures (and revisions 120 to the components) in the data store 108.

In this regard, manufactured products are typically comprised of many components which may include assemblies, sub-assemblies, parts, raw materials, or any other item that are used to manufacture an end product. It should also be appreciated that each of these different components that form the structure of the product may include different revisions. For example, such revisions may involve composition changes (e.g., a change in the grade of steel used for a bolt), structural changes (e.g., a change in shape of the part), manufacturing changes (a change from casting to stamping), and/or any other change that can be made to a component. Also, it should be appreciated that during the lifecycle of a structure, many revisions may be made to individual components for use with different product runs and for servicing the product.

The components that comprise a structure may be stored in the data store 108 such that assemblies and parts or sub-assemblies of an assembly are linked together in a manner that provides for straight forward database queries to retrieve all of the components of a structure or portion thereof. For illustrative purposes, FIG. 2 shows an example of components and revisions for a simplified product structure 200 having two levels of sub-components that may be stored in the data store 108. In this example, the product may correspond to an assembly 202 having a first revision 204 comprised of two components (parts) 206, 208, each of which has a respective revision 210, 212. In this example, the revision 212 of the second part 208 is comprised of two components (sub-assemblies) 214, 216. The first sub-assembly 214 includes one revision 218. However, the second sub-assembly 216 includes two revisions (220, 222).

In order to determine a BOM for the actual list of parts to acquire for manufacturing the product, metadata associated with revisions (e.g., dates, statuses) may be evaluated to determine which revisions to include in the product being manufactured. Selection of such revisions may be carried out using configuration rules that are processed to determine a particular set of revisions of components that will comprise a particular version of the product being manufactured.

For example, the second revision 222 of the sub-assembly may be associated with a status of released to manufacturing (whereas the first revision 220 may correspond to an experimental sub-assembly that was not released to manufacturing). To form a BOM for this product, an example embodiment of the application software component 104 may be configured to generate BOM lines for the various components of the product, and select revisions for these components that have statuses released to manufacturing. FIG. 3 illustrates an example 300 of a simplified BOM 302 that may be generated for the product structure 200, which includes such BOM lines 304, including the second revision 222. In some examples, a BOM line may also list the quantity 306 of each component that is needed for the product or assembly of the product.

It should be noted that the components included for a BOM may vary as well based on different variants of the product. For example, a structure for a truck may include variants that specify whether the truck is two wheel drive or all-wheel drive as well as either an automatic or manual transmissions. Thus a BOM may also be generated based on variant rules that define which components to include in the BOM for a particular selected variant of the product.

Once a BOM has been generated (based on an evaluation of configuration rules (and possibly variant rules), the BOM may be communicated to the entity responsible for manufacturing the product. Such an entity may use the BOM to order the necessary components to manufacture a run of the product. It should also be appreciated that components may change depending on the availability of components. Thus BOMs may also be generated that correspond to the actual revisions of components that were assembled during a manufacturing run of the product. Also, components may change after a product is manufactured. Thus BOMs may be generated that include replacement parts that are usable to service the product. In addition, BOMs may be used before a product is manufactured to design the product, estimate costs associated with a manufactured product, estimate timelines associated with the assembly of the product, and/or any other activity that may require knowledge of the actual or desired component revisions for a product manufactured or desired to be manufactured.

In addition to listing component revisions for a structural product, it should be appreciated that BOMs may be used to list ingredients of a process formula or recipe. Thus it is to be understood that as used herein, a structure may correspond to both a mechanical and/or electrical structure as well as a chemical composition. Further, it is to be understood that a component revision may correspond to a mechanical and/or electrical part as well as a particular revision of an ingredient used in a process to manufacture a composition.

In example embodiments, the term component is also used in the context of a software component. For example, as discussed in more detail herein, an example embodiment may include one or more application software components that are configured to cause a processor to carry out features and processes described herein. In this context the term "configured" refers to the software being programmed to carry out a particular function. It should be noted that BOMs may also be configured, and in such a context, the term "configured" refers to the generation of the BOM via configuration rules that instantiate which component reference to select for each BOM line.

It should also be appreciated that structural data stored in a database can be very complex with multiple references, dependencies, and a large number of different classes that may need to be traversed and processed in order to generate BOM lines for a BOM of a complex structure with many components and subcomponents. Fast configuration and expansion of a BOM for a configured structure with complex configuration parameters and methods presents a challenge for very large product structures, due to the recursive nature of some of the configuration logic involved, complex database queries required to obtain and compute respective properties, and the sheer number of components and component revisions involved, which can be in the millions or tens of millions of lines, depending on use case (e.g., an automobile or aircraft carrier).

Typically structure configuration rates in the order of hundreds of lines per second may be achieved with conventional BOM logic. However for many use cases such as Digital Mock-Up (DMU) or "where used configured" type searches or massive model visualization, performance on the order of several thousands of lines per second may be required in order for an end user to be productive carrying out such searches or model visualizations.

Example embodiments of systems and methods described herein may be used to carry out high speed branch-based hybrid BOM generation and therefore maximizing performance and throughput of BOM generation. Such faster BOM generation facilitates enhanced usability of software that uses BOMs. For example, visualization tools may use BOMs to form 2-D or 3-D model visualizations of a structure (or a portion of a structure) of a product as manufactured. Example embodiments enable a user to make minor revisions to a few components (out of potentially millions of components for large structures) and generate (in a time range of minutes rather than hours) an updated BOM in order to display a visualization of the product with the revisions, or carry out other actions with the BOM (e.g., submit the BOM to manufacturing).

Typical BOM generation (also referred to as BOM configuration) methodologies have in common that configured usages of a BOM are calculated live on the fly based on a sequence of more or less complex database level queries and other related calculations which can be quite time consuming. Such BOM configuration may require many operations which are complex in nature and require more or less deep recursion which limits achievable BOM generation performance.

An example embodiment of the described application software component may achieve enhanced BOM generation performance by scoping a configured structure into "baseline" segments that can be retrieved from an index (i.e., a cache) and other segments that are configured live (via configuration rules) for a typical use case where such live scopes of component revisions are very small compared to the indexed scopes for revisions included in the baseline structure. For example, the individual engineer may typically create or modify a small set of occurrences (revised components) in the structure "live" while working against the backdrop of usages (BOM lines) stored in a static baseline which would be indexed. In such cases, the majority of usages (i.e., BOM lines) will be statically configured in the structure for the BOM via indexed information, and only a small number of BOM lines will be configured live. Thus in example embodiments, the search/expand performance for such BOM generation is proportional to indexed performance (i.e., simple SQL database queries) compared to traditional live performance (i.e., complex configuration rule style queries and calculations).

It should be noted that example embodiments, do not require that the majority of usages (BOM lines) are configured statically. However, typical uses of the described examples will be carried out with large numbers of statically determined BOM lines compared to BOM lines configured live, and thus substantial performance gains may be achieved compared to the live configuration of the entire structure for the BOM.

The live configuration capability for a desired set of BOM lines relative to a chosen baseline may be controlled by the user or his affiliated group by maintaining (e.g., via a GUI of the application software component) a configuration specification associated with a revision rule for a BOM. Such a configuration specification may specify one or more live branches that instantiate revisions of components. BOM lines with configuration rules that specify such live branches will require live configuration, rather than being retrieved from an index for the baseline branch. Such an example embodiment combines branch-based BOM configuration with the indexing/caching of a statically configured structure baseline, in order to achieve enhanced BOM generation performance. Such a combination also enables users and groups of users to work in different scopes of changes to a structure and each achieve enhanced BOM generation performance for the revisions included in their particular scopes.

In example embodiments, a branch corresponds to a data structure that defines scope for a set of revisions of a given component. As illustrated in FIG. 1, branches 122 may be stored in the data store 108. Also it should be understood that relationships may be specified in the data store associating one or more revisions 120 of one or more components 118 with one or more branches 122. Many revisions for the same and/or different components can be associated with the same branch. Thus a branch may correspond to a scope of configuration where—in a given revision rule—the application software component that generates the BOM may only consider revisions associated with the branch of interest if the branch were specified in the revision rule.

In addition, branches themselves may be associated with each other, and as a result such branch-to-branch associations encompass revisions from other (larger) scopes as well when the software application component determines whether to configure a BOM line live or retrieve it from a baseline index. As a consequence, configuration of a BOM line may encompass the evaluation of a stack of branches. In example embodiments, a configuration specification 124 for a user may be stored in the data store 108 that specifies a stack of the branches 122 to use in order to configure a BOM for the scope of the user branch. Also in example embodiments, configuration rules 126 may be stored in the data store 108 that specify information to use to select revisions for including in a BOM, which information may include the stack of branches specified by the configuration specification 124.

The order of the branches in the stack may be used by the software application component to determine precedence in terms of which revision wins a competition to be chosen for a BOM line where multiple revisions from different branches would all be configured for a given component. In general the higher the revision in the stack of branches, the higher the precedence accorded to the revision.

Figure 4:
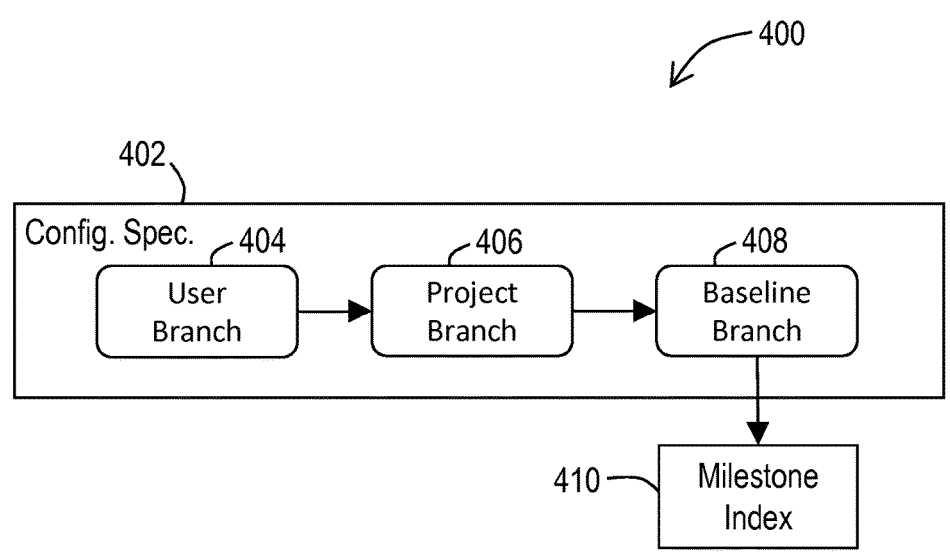
FIG. 4 illustrates an example configuration specification of branches.

FIG. 4 illustrates a schematic example 400 of a configuration specification 402 that specifies a stack of branches. In this example, the top of the stack corresponds to a first live branch such as a user branch 404 (which as the highest precedence), which is followed by a second live branch such as a project branch 406, which is followed by a baseline branch 408 (which has the lower precedence). However, it should be appreciated that a configuration specification may specify less or more branches with different names or labels. The example of a user branch and a project branch are merely intended to show one example of organizing a stack of branches for purposes of showing branched revision precedence.

In this example, the user branch and project branch may only have a small number of revisions associated, but the baseline branch corresponds to a milestone of the structure and has most of the revisions for the list of items (components) of interest associated therewith. The application software component may be used to configure a baseline BOM based on the baseline branch and produce therefrom a milestone index 410 (i.e., cache) of hard coded usages (BOM lines) for the entire structure as configured for this baseline branch.

When a new BOM is to be generated based on the user branch, project branch, and indexed baseline branch, the application software component may be configured to determine that most of the lines in the structure are from the baseline branch and therefore could be navigated at high speed to produce corresponding BOM lines. The remaining BOM lines associated with the live user and project branches, would be configured live.

Further, by generating BOMs via live branches and indexed baseline branches, it should be appreciated that different engineers can work in different scopes based on a common baseline, with multiple engineers being able to generate respectively different BOMs (at high speed) based on their particular revisions to components of the structure associated with their user or project branches.

Figure 5:
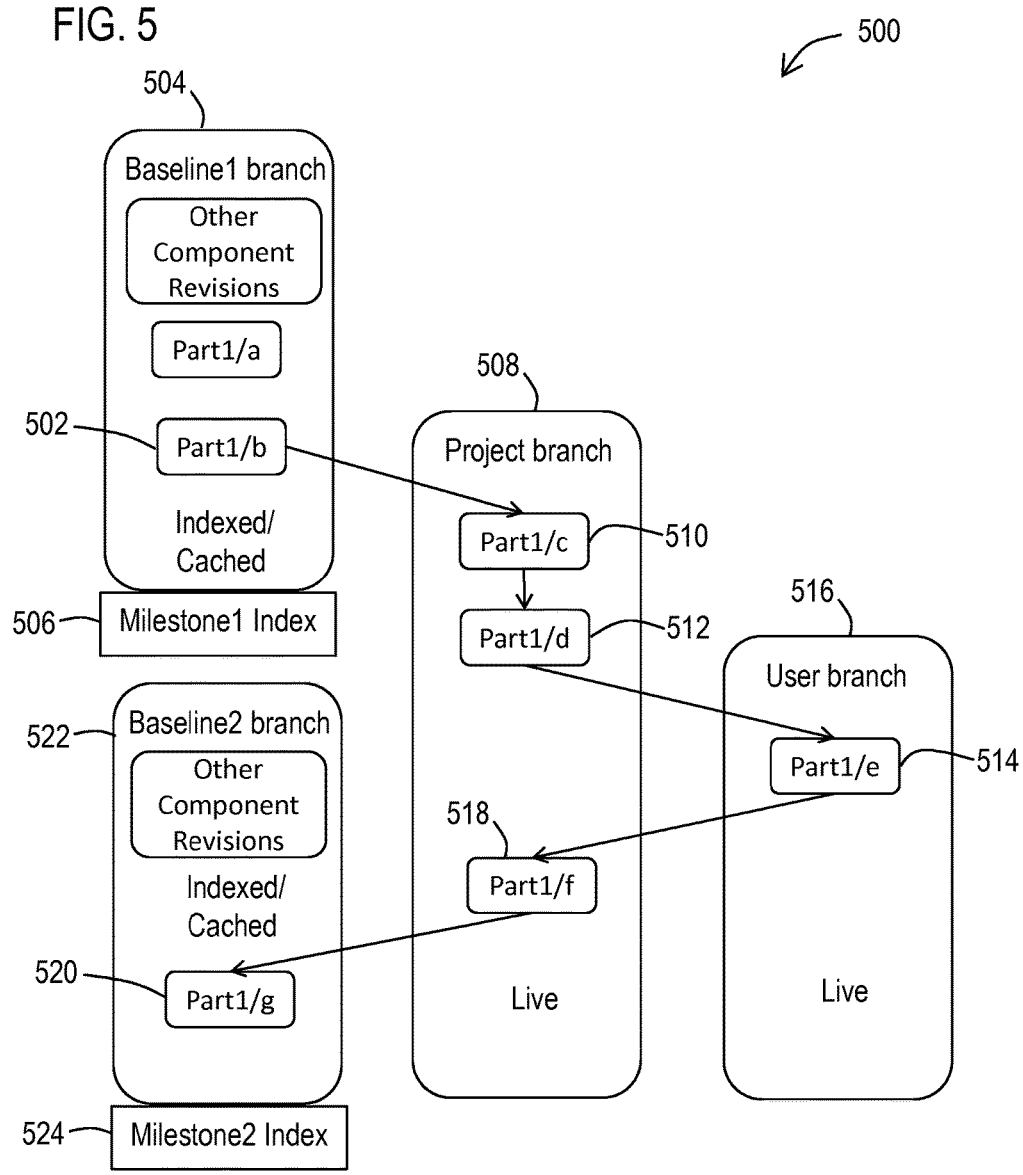
FIG. 5 illustrates examples of checked out and promoted revisions associated with branches.

For example, FIG. 5 illustrates an example of how component revisions may be organized using a hierarchy of branches 500 for a lifecycle of a structure. This example shows a component revision 502 (Part/b) included on first baseline branch 504. Such a first baseline branch 504 may have been used to configure a baseline BOM with BOM lines that are indexed/cached in a first milestone index 506.

Refinements to the structure may be carried out by individual engineers and groups of engineers simultaneously working on different projects associated with the structure. For example, a project may commence that is involved with generating a new project BOM having a revision 510 (Part1/*c*) to the component revision 502 (Part/b) included in the baseline branch. To carry out this project, a new project branch 508 may be created that is a child of the first baseline branch 504. The component revision 502 (Part/b) may be checked out (via a GUI for example) to the project branch 508 as the new revision (Part1/*c*). In addition, as the project as carried out, further revisions to the revision 510 (510/*c*) may be generated, for example, as a further revision 512 (Part1/*d*) associated with the project branch.

To produce a new BOM based on the project, BOM lines may be configured based on BOM lines from the first milestone index 506 with the exception that because the project branch included revisions 510, 512 that are not in the milestone index, then the BOM lines for this component may be configured live, such that a configuration rule is used to determine which of the revisions 510, 512 should be included in project BOM.

In addition, it should be appreciated that an individual assigned to the project may work on an additional revision 514 to the further revised component 512 (Item/d). To carry out this revision, a user branch 516 may be created that is a child of the project branch 508. The component revision 510 (Part/d) may be checked out (via a GUI for example) to the user branch 516 as the new revision 514 (Part1/*e*). A new user BOM may be configured based on BOM lines from the milestone index 506 with the exception that because the project and user branch included revisions that are not in the first baseline branch 504, then the BOM line for this component may be configured live, such that a configuration rule is used to determine which of the revisions 510, 512, 514 should be included in the user BOM. Based on the order of the project and user branches configured in the user's configuration spec (e.g., See FIG. 4), the revision 514 (Part1/*e*) may take precedence over the revisions 510, 512, 502 (Part1/*a-d*) and thus revision 514 (Part1/*e*) will be included in the BOM generated for this user using the user branch 516.

As discussed previously, branches may provide different scopes. For example, the project branch 508 may have scope via associated permissions that permit a team of engineers to see and work on revisions associated with the project branch. Whereas the user scope may be private such that only the particular user associated with the user branch 516 can see and work on the revision 514 (Part1/*e*) assigned to this user branch.

In order for other engineers associated with the project branch (in their respective configuration specifications) to see the new user revision 514 (Part1/*e*) in BOMs they may choose to generate, the application software component (via a GUI for example) may enable the user to promote his new revision 514 (Part1/*e*) back into the project branch 508. Such a promotion process may cause the revision 518 (Part1/*f*) (which corresponds to revision 514 Part1/*e* of the user branch) to be included on the project branch 508 along with revisions 510, 512 (Part1/*c-d*) for the component.

Once the new revision 518 (Part1/*f*) has been added to the project branch, other engineers assigned to the project can generate a new project BOM (again in high speed) in which BOM lines are acquired from the index with the exception that the BOM line associated with the project branch that is configured live. In this example, the configuration rule for the live BOM line may result in the newer revision 518 (Part1/*f*) being configured for the BOM line.

It should be appreciated that prior to the user's revision 514 (Part1/*e*) being promoted back to the project branch (as revision 518 Part1/*f*), BOMs generated by other users of the project would not be able to include the user's revision 514 (Part1/*e*), unless they added the user branch 516 into their configuration specification.

It should also be appreciated that revisions on the project branch 508 may be promoted (via the GUI for example) back to another branch which later may become a new baseline branch 522 and which may become visible to engineers outside the described project branch as a new revision 520 (Part1/*g*). Such a new baseline branch 522 may be created at fixed time intervals (or at other times) which gathers all new structure content promoted up at that time point. Further, a BOM may be configured from the new baseline branch 522 (via configuration rules associated with the BOM) and the resulting BOM lines may be indexed/cached as a new milestone index 524. It should be appreciated that further projects may be carried out with further project branches and user branches made relative to the new baseline branch 522 and associated milestone index 524, which will include the new revision 520 (Part1/*g*). Such new projects may be carried out, while other older or newer projects may be worked on relative to the first baseline branch 504 (which does not include the new revision 520 (Part1/*g*).

Having such well defined change isolation scopes makes it possible to define many different scopes (i.e., different project and user branches) which can contain a large amount of components to be configured for usages (BOM lines) within the structure which are essentially static and retrieved from one or more different indexes. For example, embodiments may be used to generate baseline milestone indexes periodically. These indexes would allow different users and projects to efficiently and rapidly retrieve associated information for any desired new BOM configuration based on these cached revisions. The scope of a user branch or project branch would not change when unrelated project and user branches create alternative revisions or when new baseline branches and associated milestone indexes are created. Rather new baseline branches and associated indexes may be created nightly (weekly, or at some other regular or non-regular interval), and projects and/or users may choose when to re-baseline their project and user branches in order to base them on a newer baseline that has been indexed.

In example embodiments, synchronization of an existing baseline would not be needed. Rather, the promotion of a revision to the baseline, will update the structure for the "public" branch, which are enabled to be configured at high speed, when new milestones indexes are created. This aspect also provides change isolation. Thus, changes are seen in the new baseline once it becomes available. Other changes relevant to the user's branch or project branch are seen right away due to the fact that these are configured live.

In addition, example embodiments may include nested branches that are indexed. For example, a project branch (that is sufficiently large), may have an index as well, with its own baseline that has an index. A BOM generated for a user branch may then have BOM lines configured via both indexes for components that are not revised on the user branch.

It should be noted that if an index is associated to a branch (e.g., milestone index) example embodiments may not need to continually keep the index synched with new revisions on a short time line basis. Instead, new (incremental) branches could be created with index information superseding the old (previous) index, or entirely new baselines could be generated against that same branch. In such examples, updates to these branch (via commit/promote of revision updates to the branch above a predetermined threshold) may trigger the application software component to generate index updates. However, in alternative embodiments, the generation of new milestone indexes that capture promoted revisions in the branch) may be carried out by the application software component at predetermined time intervals, and/or may occur though a manual operation via a selectable command of the application software component.

In example embodiments, an index for a baseline branch may be based on its state at the time of indexing and may be stored in a table for future retrieval of each BOM line and all its relevant properties. For example, property constructs may be defined in the software component application to determine which properties and/or metadata should and should not be included in the index for the BOM.

It should be appreciated that different BOM structures with different configurations may produce baseline indexes that achieve different performance throughputs based on how much the BOM changes when revisions are made to components of the BOM structure. An example of a BOM configuration structure that can maximize BOM generation throughput using a baseline branch index may be one that has a structure configured via rules that choose revisions based on status and/or by release date or effective date).

In order to take advantage of the performance gains achievable by the described embodiments, the application software component may include a GUI that enables a user to setup a configuration specification (such as shown in FIG. 2) via selecting an index for a baseline branch (or a project branch that is already associated with a baseline branch) for the new user branch to be based upon. When generating a new BOM, the user may configure a configuration rule to use the new user branch and configuration specification. The application software may use the configuration spec to determine the corresponding project and baseline branches for the user branch in order to generate a BOM based on the user branch. With such an arrangement an engineer working on the user or project BOM is isolated from irrelevant changes to that structure carried out by others until the next baseline becomes available, at which point the engineer may need to react to any changes in the next baseline by "re-basing" his engineering content revisions.

Also, as mentioned previously, the application software component may be responsive to such a branch hierarchy specified in a configuration spec (e.g., see FIG. 2) to carry out configuration precedence logic as to which revisions are configured for a BOM. FIG. 6 illustrates an example 600 of how such precedence logic may be carried out to configure a BOM. As in FIG. 5, this example includes a baseline branch 602, a project branch 604, and a user branch 606.

For example, a BOM may be configured by status (e.g., latest release) and branch, where the branch is specified to be the user branch 606. Based on the configuration spec. (shown in FIG. 2), revisions from the user branch 606, project branch 604 and baseline branch 602 are used to generate the BOM in the precedence order specified in the configuration spec.

In this example, any revision with the configured status (e.g., latest release status) in the user branch may be determined by the application software component to have precedence over other branches. In this example, revision 608 (Part1/e) and revision 610 (Part1/f) are included on the user's user branch 606. Of these revisions, revision 608 (Part1/e) has a status of released and would have precedence over Part1/f (which is not released). In addition, because revision 608 (Part1/e) is checked out into the user's user branch 606, it will have higher precedence than other revisions in other branches (such as revision 614 Part1/c in the project branch) specified in the configuration specification.

Had the engineer not checked out Part1 into his branch, revision 614 (Part1/c) would have been configured for the BOM generated by the user based on the project branch 604. This follows because the revision 614 (Part1/c) has a latest release status and not the revision 612 (Part1/d), revision 616 (Part1/a), or revision 618 (Part1/b) based on the project branch 604 having a higher precedence that the baseline branch 602 in the configuration spec.

It should be noted that the baseline branch 602 may include other component revisions 620 that are also not checked out to the project or user branches. The application software component is operative to carry out BOM configuration logic based on this example and would decide that the milestone1 index 622 for the baseline branch is solely responsible for the configuration of the BOM lines for components corresponding to such other revisions 620. In other words, the BOM configuration logic for the application software component would thus determine that the resulting BOM line for such other components would not need to be configured live, and would instead be retrieved from the milestone index 622. Enhanced throughput of BOM generation would be achieved because for a large majority of lines in such a BOM, the milestone index would be responsible for providing the associated (statused) revisions.

In example embodiments, a set of contexts may also impact when a BOM line is configured live or retrieved from an index for a baseline branch. For example, FIG. 7 shows an example of a BOM 700 with BOM lines 702, 704, and 706 having notations regarding how the BOM lines are generated. These BOM lines specify an assembly revision 708 (Assembly1/a) that is comprised of a part revision 710 (Part1/a), that further includes a subassembly 712 (SubAssem1/a). After the BOM has been generated (configured) as shown in FIG. 7, a baseline branch index 714 (milestone1) may be generated for the BOM through operation of the described application software component. Such an index will include all of the BOM lines 702, 704, 706. Thus when this BOM is again generated, all of the BOM lines for the structure may be retrieved from the baseline index 714 (milestone1). They do not need to be configured live again.

FIG. 8 shows an example of a further BOM 800 with BOM lines 802, 804, 806. Similar to the BOM 700 shown in FIG. 7, these BOM lines specify the same assembly revision 708 (Assembly1/a) that is comprised of the same part revision 710 (Part1/a). However, in this example the BOM 800 includes a different sub-assembly revision 808 (SubAssem1/b) compared to the sub-assembly revision 712 (SubAssem1/a) shown in FIG. 7. Such a revision could have been made, for example, by a user checking out and revising the subassembly component in a user branch 810 (branch user2).

The modifications that produced the revision 808 (SubAssem1/b) supersede what was configured in the baseline index 714 (milestone1). Thus, as discussed previously, the application software component according to the described BOM configuration logic, may be operative to detect that this sub-assembly has a revisions in a branch that is not in the baseline index 714 (milestone1) and thus will configure the BOM line 806 live (which produces the SubAssem1/b revision for the BOM line 806 rather than the SubAssem1/*a* 712 revision from the baseline index 714). However, when the BOM 800 is generated the BOM lines 802, 804 will continue to be retrieved from the baseline index 714 (milestone1).

FIG. 9 shows an example of yet another BOM 900 with BOM lines 902, 904, 906. Similar to the BOM 700 shown in FIG. 7, these BOM lines specify the same assembly revision 708 (Assembly1/*a*) and the same sub-assembly revision 712 (SubAssem1/*a*). However, in this example the BOM 900 includes a different part revision 908 (Part1/*b*) compared to the part revision 710 (Part1/*a*) shown in FIGS. 7 and 8. Such a revision could have been made, for example, by a user checking out and revising the part component in a user branch 810 (branch user2).

It should be noted that the new revised part revision 908 (Part1/*b*) still includes the same sub-assembly revision 712 (SubAssem1/*a*) as in FIG. 7, which sub-assembly revision is still in the baseline index 714 (milestone1). However, even though sub-assembly revision 712 is still included in the baseline index (milestone1), the context has changed, because its parent part is not in the index and will be configured live. The application software component may be operative to determine that a child revision (that is in the index) has a parent component that is to be configured live, and thus may be operative to configure children of the parent component live as well.

From the above examples, the following functions may be carried out to generate a BOM for a user based on revisions checked out to the user's branch. Such functions may include the described application software component using the users' configuration specification to determine live branches (e.g., user project branches) and their associated baseline branch. The application software may then begin at the baseline branch and for each top level structure, determine whether a child component is checked out in any of the live branches. Such components in the live branches may be included in an application logic cache and/or an in-memory transient cache and would typically be small in number compared to the number of revisions included in the baseline index.

If the child component is not checked out to a live branch, the application software component may be operative to retrieve the BOM line from the baseline index at high speed. However, if the component is found to be checked out in a live branch, the application software component may configure the BOM line for the child component live based on the configuration rule associated with the BOM line. In addition the application software component may be operative to configure live the any BOM lines that are children of BOM lines that are configured live.

With reference now to FIG. 10, various example methodologies are illustrated and described. While the methodologies are described as being a series of acts that are performed in a sequence, it is to be understood that the methodologies may not be limited by the order of the sequence. For instance, some acts may occur in a different order than what is described herein. In addition, an act may occur concurrently with another act. Furthermore, in some instances, not all acts may be required to implement a methodology described herein.

It is important to note that while the disclosure includes a description in the context of a fully functional system and/or a series of acts, those skilled in the art will appreciate that at least portions of the mechanism of the present disclosure and/or described acts are capable of being distributed in the form of computer-executable instructions contained within non-transitory machine-usable, computer-usable, or computer-readable medium in any of a variety of forms, and that the present disclosure applies equally regardless of the particular type of instruction or signal bearing medium or storage medium utilized to actually carry out the distribution. Examples of non-transitory machine usable/readable or computer usable/readable mediums include: ROMs, EPROMs, magnetic tape, floppy disks, hard disk drives, SSDs, flash memory, CDs, DVDs, and Blu-ray disks. The computer-executable instructions may include a routine, a sub-routine, programs, applications, modules, libraries, a thread of execution, and/or the like. Still further, results of acts of the methodologies may be stored in a computer-readable medium, displayed on a display device, and/or the like.

Referring now to FIG. 10, a methodology 1000 that facilitates manipulation of objects is illustrated. The method may start at 1002 and at 1004 the methodology may include through operation of at least one processor, generating a Bill of Materials (BOM) having a plurality of BOM lines that instantiate component revisions of components stored in a data store that are usable to build a structure. Such BOM lines are configured via at least one baseline branch and at least one live branch that instantiate component revisions for the structure. The generating act 1004 may include an act 1006 of retrieving BOM lines for the BOM for components having revisions that are not associated with the at least one live branch from at least one index of BOM lines generated based on the baseline branch. The generation act 1004 may also include an act 1008 of configuring BOM lines for the BOM for components having revisions associated with the at least one live branch via at least one configuration rule. In addition the methodology may include an act 1010 of causing a display device to output a list of component revisions based at least in part on the generated BOM. At 1012 the methodology may end.

In addition, the methodology 1000 may include other acts and features discussed previously with respect to the system 100. For example, the data store may include a configuration specification that specifies a stack of branch relations that define that at least one branch has a higher precedence than at least one other branch. The BOM may be generated responsive to the branches and an order of precedence of the branches from the configuration specification.

Also in example embodiments, the at least one live branch may include a first live branch and a second live branch. The configuration specification may associate the first live branch with the second live branch, and may associate the second live branch with the baseline branch. The BOM may then be generated responsive to the associations between the first and second live branches and the baseline branch from the configuration specification.

In addition, the described methodology may include providing a GUI through the at least one display device. The GUI may enable a user to create the user branch and check out at least one component from the project branch for associating a component revision to the user branch. Also the GUI may enable a user to create the first live branch and check out at least one component from the second live branch for associating a component revision to the first live branch. The GUI may also enable a user to promote the component revision associated with the first live branch to the second live branch.

Also, the provided GUI may enable the promoted component revision in the second live branch to be promoted and gathered into a further baseline branch.

In example embodiments, the methodology may also include generating a new index for the further baseline branch which includes a configured BOM line that includes the promoted component revision. In addition the GUI may enable the user to select which of the baseline branch or the further baseline branch to include in the configuration specification.

In example embodiments, the methodology may include using the generated BOM to carry out some action with respect to the structure. For example, the methodology may include communicating the BOM to an entity responsible for manufacturing the structure from the component revisions listed on the BOM. Further, the methodology may include manufacturing the structure based at least in part on the BOM. In addition, the methodology may include causing a display screen to display a 2-D or 3-D visual representation of the structure including the components listed in the BOM.

As discussed previously, such acts associated with these methodologies may be carried out by one or more processors. Such processor(s) may be included in one or more data processing systems, for example, that execute software components operative to cause these acts to be carried out by the one or more processors. In an example embodiment, such software components may be written in software environments/languages/frameworks such as Java, JavaScript, Python, C, C#, C++ or any other software tool capable of producing components and graphical user interfaces configured to carry out the acts and features described herein.

FIG. 11 illustrates a block diagram of a data processing system 1100 (also referred to as a computer system) in which an embodiment can be implemented, for example, as a portion of a PLM, CAD, and/or drawing system operatively configured by software or otherwise to perform the processes as described herein. The data processing system depicted includes at least one processor 1102 (e.g., a CPU) that may be connected to one or more bridges/controllers/buses 1104 (e.g., a north bridge, a south bridge). One of the buses 1104, for example, may include one or more I/O buses such as a PCI Express bus. Also connected to various buses in the depicted example may include a main memory 1106 (RAM) and a graphics controller 1108. The graphics controller 1108 may be connected to one or more display devices 1110. It should also be noted that in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 1112 (Ethernet controllers, WiFi controllers, cellular controllers) operative to connect to a local area network (LAN), Wide Area Network (WAN), a cellular network, and/or other wired or wireless networks 1114 or communication equipment.

Further components connected to various busses may include one or more I/O controllers 1116 such as USB controllers, Bluetooth controllers, and/or dedicated audio controllers (connected to speakers and/or microphones). It should also be appreciated that various peripherals may be connected to the USB controller (via various USB ports) including input devices 1118 (e.g., keyboard, mouse, touch screen, trackball, gamepad, camera, microphone, scanners, motion sensing devices), output devices 1120 (e.g., printers, speakers) or any other type of device that is operative to provide inputs or receive outputs from the data processing system. Further it should be appreciated that many devices referred to as input devices or output devices may both provide inputs and receive outputs of communications with the data processing system. Further it should be appreciated that other peripheral hardware 1122 connected to the I/O controllers 1116 may include any type of device, machine, or component that is configured to communicate with a data processing system.

Additional components connected to various busses may include one or more storage controllers 1124 (e.g., SATA). A storage controller may be connected to a storage device 1126 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 1104 such as a PCI Express bus.

A data processing system in accordance with an embodiment of the present disclosure may include an operating system 1128, software/firmware 1130, and data stores 1132 (that may be stored on a storage device 1126). Such an operation system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems.

The communication controllers 1112 may be connected to the network 1114 (not a part of data processing system 1100), which can be any public or private data processing system network or combination of networks, as known to those of skill in the art, including the Internet. Data processing system 1100 can communicate over the network 1114 with one or more other data processing systems such as a server 1134 (also not part of the data processing system 1100). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Further, the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely.

In addition, it should be appreciated that data processing systems may be implemented as virtual machines in a virtual machine architecture or cloud environment. For example, the processor 1102 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 1100 in this example may correspond to a computer, workstation, and/or a server. However, it should be appreciated that alternative embodiments of a data processing system may be configured with corresponding or alternative components such as in the form of a mobile phone, tablet, controller board or any other system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, which may have the form of a controller board, computer, server, mobile phone, and/or any other type of electronic device.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 1100 may conform to any of the various current implementations and practices known in the art.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A system comprising:
   at least one processor that is configured to:
   generate a Bill of Materials (BOM) having a plurality of BOM lines that instantiate component revisions of components stored in a data store that are usable to build a physical product, which BOM lines are configured via at least one baseline branch and at least one live branch that instantiate component revisions for the physical product,
   retrieve, without configuring, BOM lines for the BOM for components having revisions that are not associated with the at least one live branch from at least one index of BOM lines generated based on the baseline branch;
   configure BOM lines for the BOM for components having revisions associated with the at least one live branch via at least one configuration rule;
   cause a display device to output a list of component revisions based at least in part on the generated BOM; and
   transmit the BOM to another system so that the physical product is manufactured based at least in part on the BOM.

2. The system according to claim 1, wherein:
   the data store includes a configuration specification that specifies a stack of branch relations that define that at least one branch has a higher precedence than at least one other branch, and
   the BOM is generated responsive to the branches and an order of precedence of the branches from the configuration specification.

3. The system according to claim 2, wherein:
   the at least one live branch includes a first live branch and a second live branch,
   the configuration specification associates the first live branch with the second live branch, and associates the second live branch with the baseline branch, and
   the BOM is generated responsive to the associations between the first and second live branches and the baseline branch from the configuration specification.

4. The system according to claim 3, wherein:
   the at least one processor is configured to provide a graphical user interface (GUI) through operation of the at least one display device,
   the GUI enables a user to create the first live branch and check out at least one component from the second live branch for associating a component revision to the first live branch, and
   the GUI enables the user to promote the component revision associated with the first live branch to the second live branch.

5. The system according to claim 4, wherein the at least one processor is configured to provide the first live branch and the second live branch with different scopes, such that BOMs generated based on a configuration specification with the second live branch and not the first live branch do not include the at least one component revision associated with the first live branch until the component revision associated with the first live branch is promoted to the second live branch.

6. The system according to claim 5, wherein the GUI enables the promoted component revision in the second live branch to be promoted and gathered into a further baseline branch.

7. The system according to claim 6, wherein the processor is configured to generate a new index for the further baseline branch which includes a configured BOM line that includes the promoted component revision.

8. The system according to claim 6, wherein the GUI enables the user to select which of the baseline branch or the further baseline branch to include in a configuration specification.

9. The system according to claim 2, wherein the at least one processor is configured to cause the display device to output a 3-D visualization of the physical product having the components specified by the BOM.

10. The system according to claim 9, further comprising the data store, the display device, and an application software component comprised of instructions that when included in the memory and executed by the at least one processor, cause the at least one processor to generate and output the BOM and the 3-D visualization of the physical product through the display device.

11. A method comprising:
through operation of at least one processor:
generating a Bill of Materials (BOM) having a plurality of BOM lines that instantiate component revisions of components stored in a data store that are usable to build a physical product, which BOM lines are configured via at least one baseline branch and at least one live branch that instantiate component revisions for the physical product, including:
retrieving, without configuring, BOM lines for the BOM for components having revisions that are not associated with the at least one live branch from at least one index of BOM lines generated based on the baseline branch; and
configuring BOM lines for the BOM for components having revisions associated with the at least one live branch via at least one configuration rule,
causing a display device to output a list of component revisions based at least in part on the generated BOM, and
transmitting the BOM to another system so that the physical product is manufactured based at least in part on the BOM.

12. The method according to claim 11, wherein:
the data store includes a configuration specification that specifies a stack of branch relations that define that at least one branch has a higher precedence than at least one other branch, and
the BOM is generated responsive to the branches and an order of precedence of the branches from the configuration specification.

13. The method according to claim 12, wherein:
the at least one live branch includes a first live branch and a second live branch,
the configuration specification associates the first live branch with the second live branch, and associates the second live branch with the baseline branch, and
the BOM is generated responsive to the associations between the first and second live branches and the baseline branch from the configuration specification.

14. method according to claim 13, further comprising:
through operation of the at least one processor, providing a graphical user interface (GUI) through the at least one display device,
wherein the GUI enables a user to create the first live branch and check out at least one component from the second live branch for associating a component revision to the first live branch, and
wherein the GUI enables the user to promote the component revision associated with the first live branch to the second live branch.

15. The method according to claim 14, further comprising:
through operation of the at least one processor, providing the first live branch and the second live branch with different scopes, such that BOMs generated based on a configuration specification with the second live branch and not the first live branch do not include the at least one component revision associated with the first live branch until the component revision associated with the first live branch is promoted to the second live branch.

16. The method according to claim 15, wherein the GUI enables the promoted component revision in the second live branch to be promoted and gathered into a further baseline branch.

17. The method according to claim 16, further comprising:
through operation of the at least one processor, generating a new index for the further baseline branch which includes a configured BOM line that includes the promoted component revision.

18. The method according to claim 16, wherein the GUI enables the user to select which of the baseline branch or the further baseline branch to include in the configuration specification.

19. The method according to claim 11, further comprising manufacturing the physical product based at least in part on the BOM.

20. A non-transitory computer readable medium encoded with executable instructions that when executed, cause at least one processor to carry out a method comprising:
generating a Bill of Materials (BOM) having a plurality of BOM lines that instantiate component revisions of components stored in a data store that are usable to build a physical product, which BOM lines are configured via at least one baseline branch and at least one live branch that instantiate component revisions for the physical product, including:
retrieving, without configuring, BOM lines for the BOM for components having revisions that are not associated with the at least one live branch from at least one index of BOM lines generated based on the baseline branch; and
configuring BOM lines for the BOM for components having revisions associated with the at least one live branch via at least one configuration rule,
causing a display device to output a list of component revisions based at least in part on the generated BOM, and
transmitting the BOM to another system so that the physical product is manufactured based at least in part on the BOM.

* * * * *